United States Patent [19]

Kobayashi

[11] Patent Number: 5,069,305
[45] Date of Patent: Dec. 3, 1991

[54] POWER TRANSMISSION SYSTEM FOR A FOUR-WHEEL DRIVE MOTOR VEHICLE

[75] Inventor: Toshio Kobayashi, Tokyo, Japan
[73] Assignee: Fuji Jukogyo Kabushiki Kaisha, Tokyo, Japan
[21] Appl. No.: 512,751
[22] Filed: Apr. 20, 1990

[30] Foreign Application Priority Data

Apr. 27, 1989 [JP] Japan .................................. 1-110872
Apr. 28, 1989 [JP] Japan .................................. 1-111737

[51] Int. Cl.⁵ .......................................... B60K 41/18
[52] U.S. Cl. .................................. 180/249; 364/424.1
[58] Field of Search ............... 180/247, 248, 249, 197, 180/250, 76, 233; 364/424.1

[56] References Cited

U.S. PATENT DOCUMENTS 4,751,856 6/1988 Nakamura et al. ............. 180/249 X
4,766,973 3/1988 Kashihara et al. .................. 180/249
4,889,204 12/1989 Furuya et al. .................. 180/248 X

FOREIGN PATENT DOCUMENTS 61-155027 7/1986 Japan .
62-103227 5/1987 Japan .

Primary Examiner—Charles A. Marmor
Assistant Examiner—Alan M. Kagen
Attorney, Agent, or Firm—Martin A. Farber

[57] ABSTRACT

A fluid-operated transfer clutch provided adjacent a rear differential so as to transmit output torque of a transmission to a front differential. A fluid-operated restricting clutch is provided adjacent the rear differential and disposed between a differential case and a corresponding axle so as to restrict differential operation of the rear differential. Clutch pressure of each clutch is controlled in accordance with driving conditions of the vehicle.

7 Claims, 14 Drawing Sheets

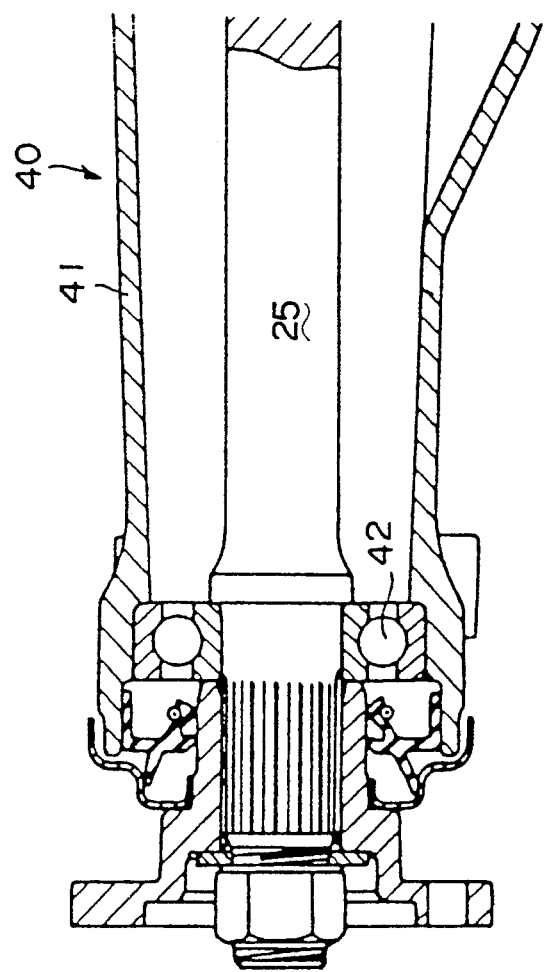

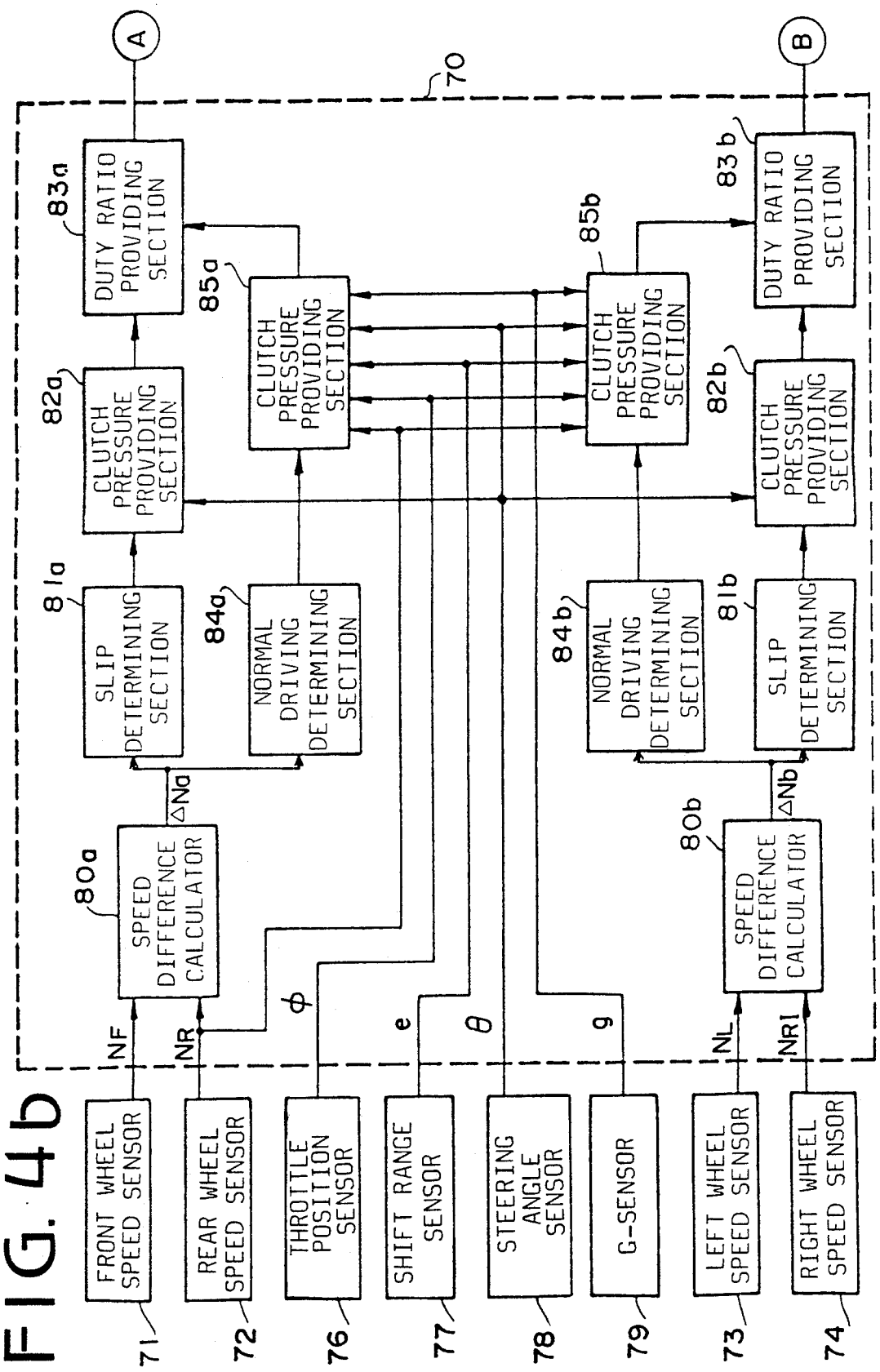

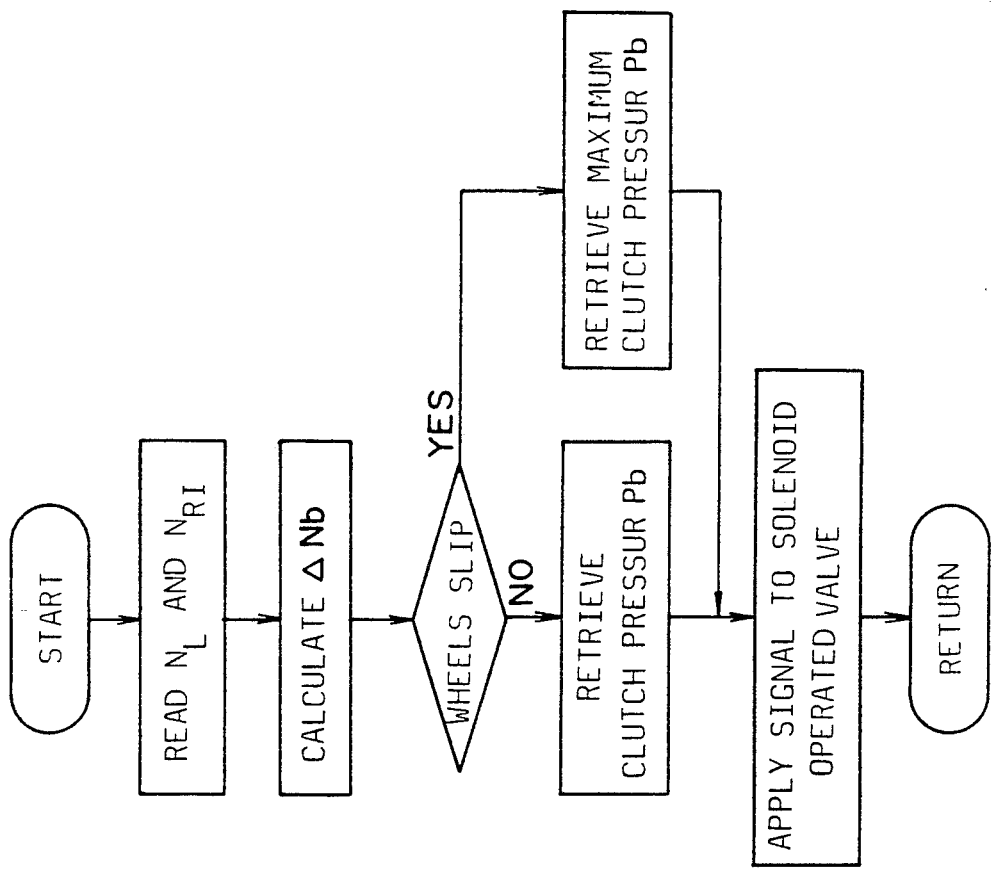

POWER TRANSMISSION SYSTEM FOR A FOUR-WHEEL DRIVE MOTOR VEHICLE

BACKGROUND OF THE INVENTION

The present invention relates to a power transmission system for a four-wheel drive motor vehicle, and more particularly to a system having fluid-operated multiple-disk friction clutches for distributing torque of an engine to front and rear wheels of the vehicle and for controlling the torque to the right and left driving wheels wherein the torque distribution ratio to the front and rear wheels and to the right and left wheels are controlled in accordance with driving conditions of the motor vehicle and road surface conditions.

Japanese Patent Application Laid-Open 61-155027 discloses a system in which a pair of multiple-disk transfer clutches for front wheels and for rear wheels are provided in a transfer device for controlling the distribution of the torque to the front wheels and the rear wheels.

Japanese Patent Application Laid-Open No. 62-103227 discloses a system for controlling the differential operation of a differential disposed between right and left wheels. In the system, a fluid operated multiple-disk friction clutch is provided between a differential case and a side gear of a differential for restricting the differential operation. Actuating pressure of liquid for the clutch is controlled for changing the differential operation restricting torque so as to improve the driveability and maneuverability of the motor vehicle.

In order to improve the driveability and maneuverability of the vehicle, it is preferable to provide both the torque distribution device and the differential restricting device in a four wheel drive vehicle. However, a hydraulic control circuit having control valves for controlling the clutches must be provided in pairs and oil pumps must be provided so that there is a problem of arranging these elements in the power transmission system. Namely, the clutches and the control systems are preferably disposed in a case housing the transmission or the differential.

On the other hand, the multiple-disk friction clutch uses the oil (automatic transmission fluid) in the automatic transmission as actuating oil for actuating and lubricating the clutch, since the oil has a good friction characteristic and low oil viscosity. On the other hand, a final reduction gear of the differential provided on the outside of the differential case is composed of a hypoid gear. In such a differential, the extreme pressure agent which contains additives improves the ability to adhere to the surfaces of metals under high bearing pressures. Such an agent is liable to cause the multiple disks of the clutch to stick and to slip, which cause unpleasant vibrations of and noise from the vehicle body.

Moreover, the clutch comprises a clutch drum and a clutch hub, each having a plurality of disks, and a piston oil chamber formed between the clutch drum and a piston. The piston is slidably mounted on the clutch drum with splines for pushing the disks of the clutch drum to the disks of the hub. When the clutch drum rotates, the piston rotates together with the clutch drum. When the clutch rotates at a high speed, the centrifugal force of oil in the piston oil chamber is exerted on the piston. When disengaging the clutch, the pressure of the oil is reduced. However, the centrifugal force acts to push the piston to the disks of the clutch drum, so that the clutch cannot be completely disengaged. Further, the centrifugal force causes various disadvantages in accurate control of the pressure of oil.

SUMMARY OF THE INVENTION

An object of the present invention is to provide a power transmission system in which a transfer clutch and a clutch for restricting differential operation of a differential are provided so as to improve driveability, steerability, driving stability and starting characteristics of a motor vehicle.

An other object of the present invention is to provide a power transmission system in which no centrifugal force is produced in the clutches.

Another object of the present invention is to provide a system in which an exclusive oil supply system is provided for the clutches.

According to the present invention, there is provided a power transmission system for a four-wheel drive motor vehicle having a transmission for transmitting output torque of an engine to front and rear wheels through a front differential and a rear differential respectively.

The system comprises a fluid-operated transfer clutch provided adjacent one of the front differential and the rear differential so as to transmit the output torque of the transmission to said one differential, a fluid-operated restricting clutch provided adjacent said one differential and disposed between said one differential and a corresponding axle so as to restrict differential operation of said one differential, and control means for controlling clutch pressure of each of the clutches in accordance with driving conditions of the vehicle.

In an aspect of the invention, the transfer clutch is provided in a transfer clutch case secured to a carrier of said one differential and separated from said one differential by an oil seal, and the restricting clutch is provided in a restricting clutch case secured to the carrier of said one differential and separated from the differential by the oil seal.

According to another feature of the invention the restricting clutch is provided coaxially with the axis of the corresponding axles and has an outer drum operatively connected to one of the differential case and either of the axles, an inner drum operatively connected to the other, a plurality of outer disks secured to the outer drum, a plurality of inner disks secured to the inner drum, a piston slidably mounted in a piston chamber and operated by oil supplied to the piston chamber for engaging the outer disks and inner disks with each other, and a centrifugal oil pressure chamber formed adjacent the piston chamber so as to control the centrifugal force of oil in the piston chamber.

The other objects and features of this invention will become understood from the following description with reference to the accompanying drawings.

BRIEF DESCRIPTION OF DRAWINGS

FIGS. 3a and 3b show a sectional view taken along a line III—III of FIGS. 2a and 2b;

FIGS. 4a and 4b show a hydraulic control system for controlling fluid operated multiple-disk friction clutches of the system;

FIGS. 5a and 5b show flowcharts showing the operations of a control unit of the system;

DETAILED DESCRIPTION OF THE PREFERRED EMBODIMENTS

Figure 1:
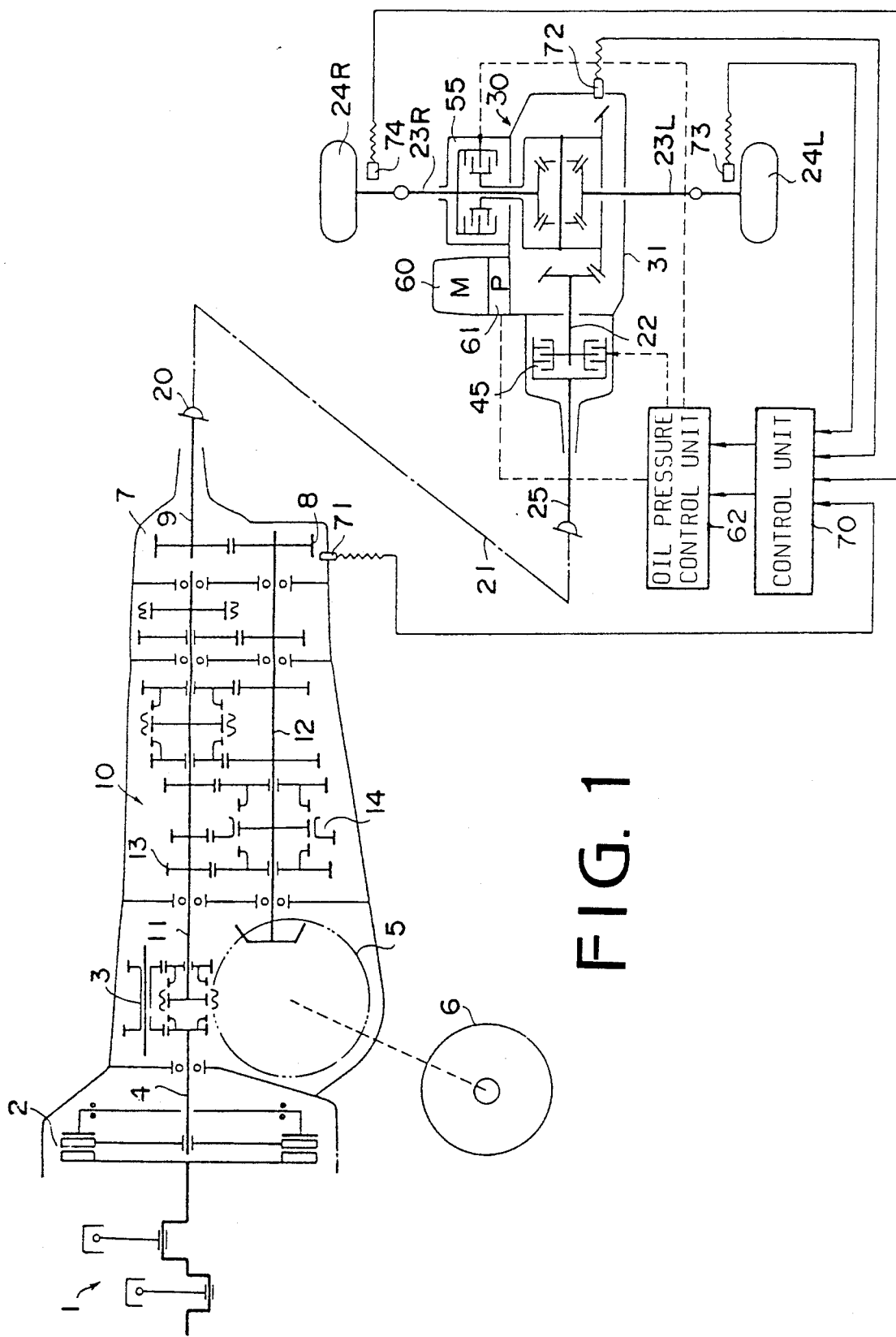
FIG. 1 shows a schematic diagram of a power transmission system according to the present invention.
Figure 2A:
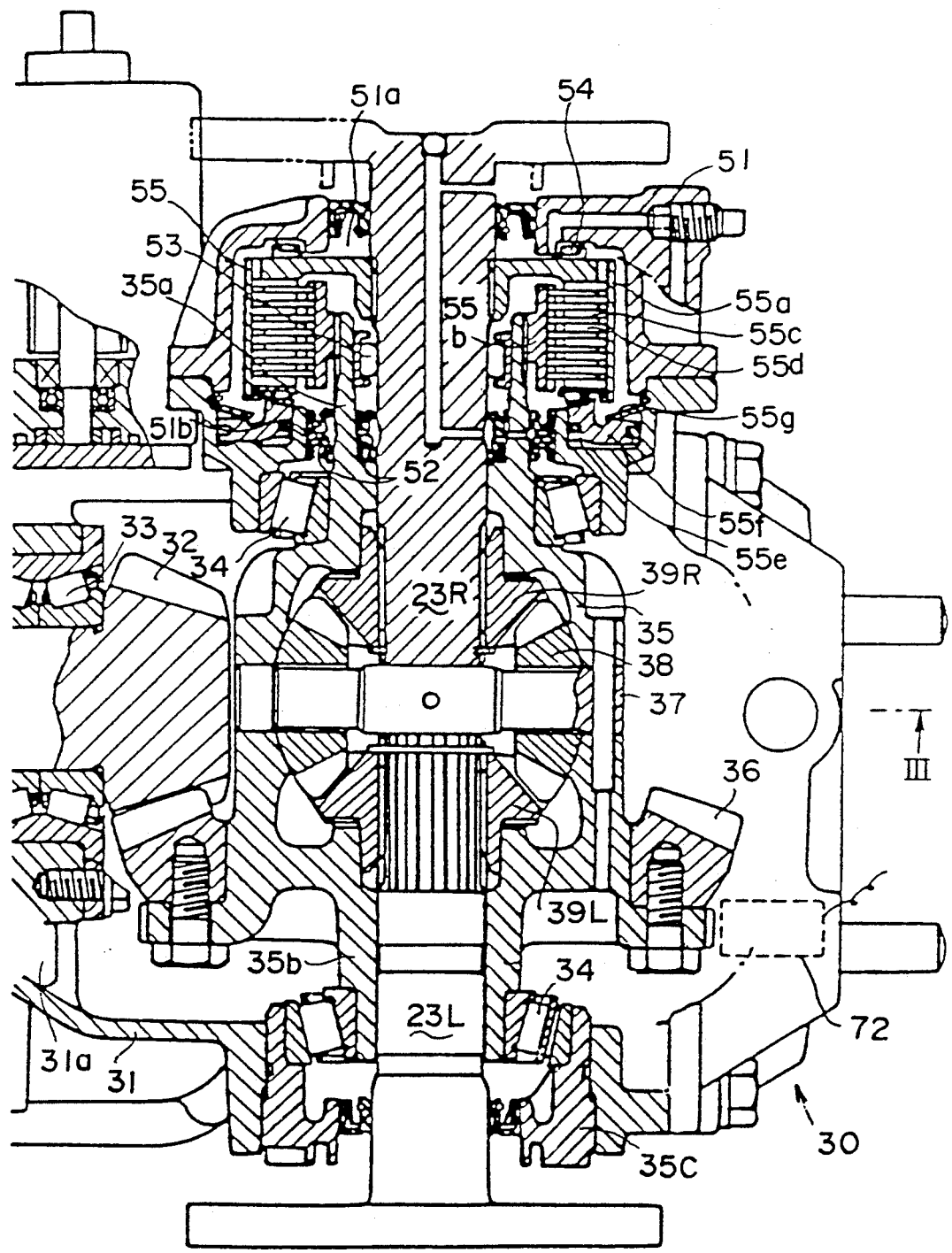
FIGS. 2a and 2b show a sectional view of a main part of the system.
Figure 2B:
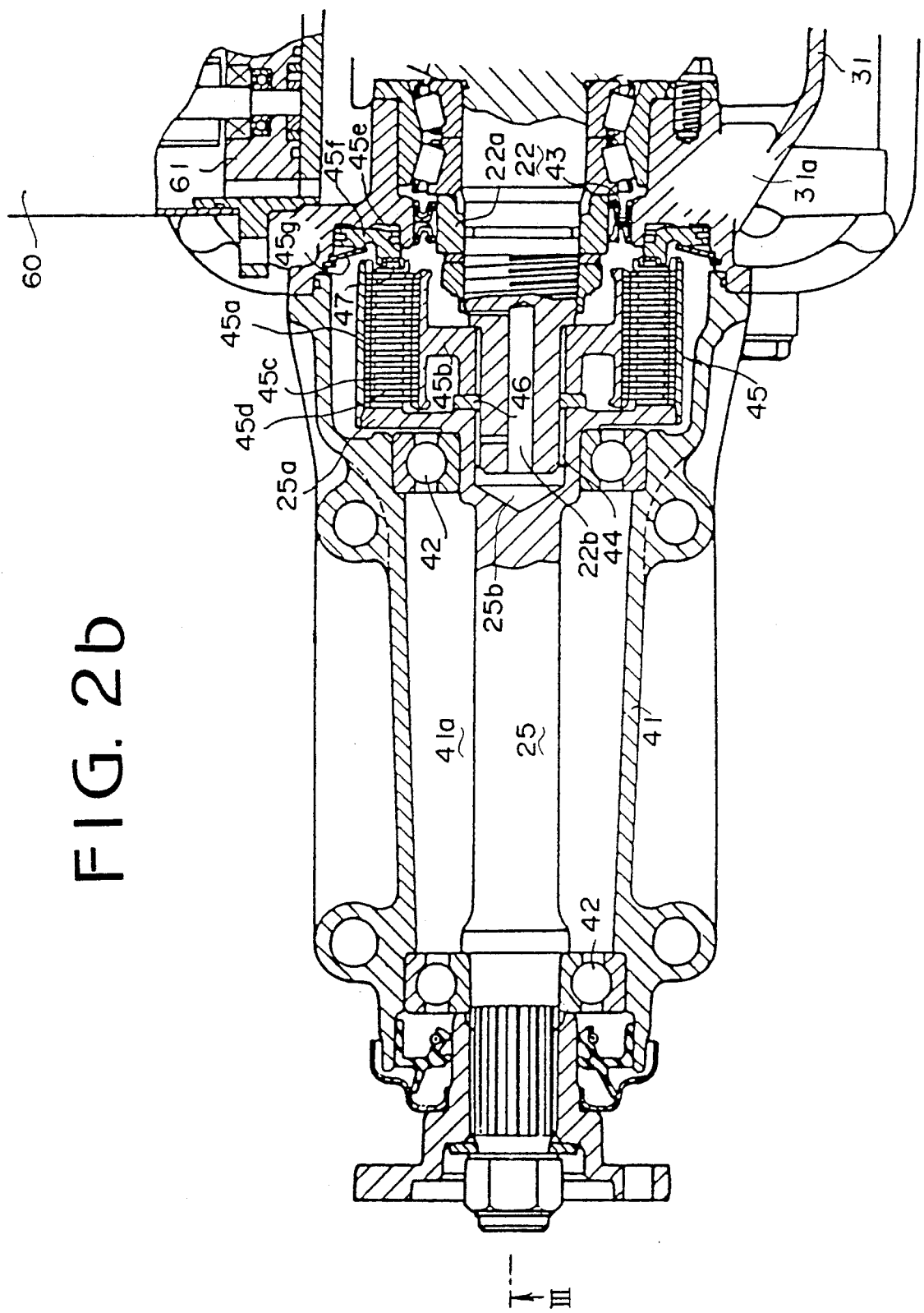
Figure 3A:
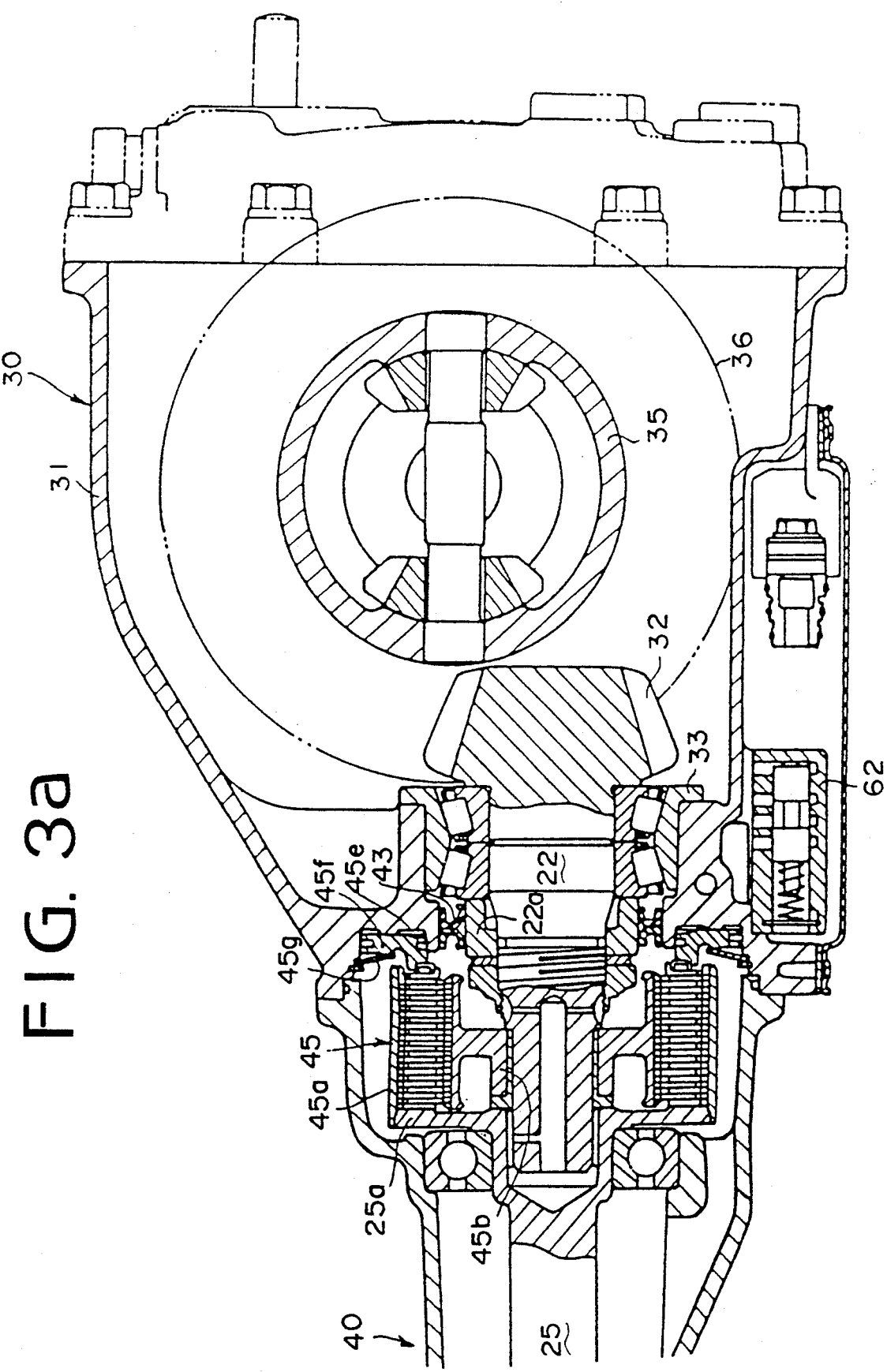

FIG. 1 shows a power transmission system in a four-wheel drive motor vehicle having an engine 1 longitudinally mounted at a front portion thereof. A crankshaft of the engine 1 is connected to a sub-transmission 3 through a clutch 2 and a drive shaft 4. The sub-transmission 3 has a reduction gear disposed between the drive shaft 4 and an input shaft 11, and a selector mechanism for selecting the gears of the sub-transmission.

A main manual transmission 10 connected to the input shaft 11 has an output shaft 12 parallel with the input shaft 11, a plurality of change-speed gears 13 and synchronizers 14. The output shaft 12 is integral with a drive pinion which engages with a crown gear of a final reduction device 5 of a differential for front wheels 6. The output shaft 12 is connected to a transfer shaft 9 through a pair of transfer gears 8 of a transfer device 7 provided behind the manual transmission 10.

The transfer shaft 9 is operatively connected to a propeller shaft 21 through a universal joint 20, thereby transmitting the power of the engine 1 to a transfer clutch 45 through a rear drive shaft 25. The power is transmitted to rear wheels 24R and 24L through a rear differential 30 and axles 23R and 23L at a predetermined distribution ratio determined by the clutch 45.

Referring to FIGS. 2a, 2b, 3a and 3b a carrier 31 of the rear differential 30 which is suspended from the body (not shown) of the vehicle has a cylindrical portion 31a as a transfer clutch casing for the clutch 45. An extension case 41 is secured to a front end of the cylindrical portion 31a. The rear drive shaft 25 is rotatably mounted in the extension case 41 through a pair of bearings 42 at both ends thereof and connected to the propeller shaft 21. A drive pinion shaft 22 having a drive pinion 32 is rotatably mounted in the carrier 31 of the rear differential 30 through a bearing 33. An end of the drive pinion shaft 22 is rotatably mounted in a hollow end 25b of the rear drive shaft 25 through a needle bearing 44. The drive pinion 32 engages with a final reduction gear 36. The transfer clutch 45 is mounted on the drive pinion shaft 22 in the cylindrical portion 31a and an oil pump 61 and a motor 60 for driving the pump 61 are secured to a side of the cylindrical portion 31a for supplying oil to the transfer clutch 45.

The transfer clutch 45 comprises a drive drum 45a secured to a flange 25a of the rear drive shaft 25 and a driven drum 45b splined on the drive pinion shaft 22. A front end of the driven drum 45b engages with a thrust washer 46 which abuts on the flange 25a of the rear drive shaft 25. A plurality of drive disks 45c are splined on the drum 45a and a plurality of driven disks 45d are splined on the drum 45b, disposed alternately with the disks 45c. A piston 45f is slidably mounted in a piston chamber 45e defined by the piston 45f, and the cylindrical portion 31a. A return spring 45g urges the piston 45f to abut against an end disk 45c by a thrust bearing 47, whereby no centrifugal force is exerted the piston 45f even though the clutch drum rotates.

An oil seal 43 is provided between the cylindrical portion 31a in inner peripheries and a spacer 22a on the drive pinion shaft 22.

Since characteristics of the oil for the transfer clutch 45 provided in a chamber 41a in the extension case 41 and for hypoid gears of the differential 30 are different from each other, the oil seal 43 is provided for preventing both oils from mixing.

An oil passage 22b is formed in the drive pinion shaft 22, so as to lubricate the clutch 45.

When the clutch drum 45a rotates, the oil in the oil chamber 41a in the extension case 41 is drawn up by the outer wall of the drive drum 45a, and supplied to the oil passage 22b through an oil guide (not shown). The oil passes through the passages 22b and enters the chamber in the driven drum 45b. Further, the oil is supplied to disks 45c through passages (not shown) radially formed in the spline portion of the driven drum 45b.

The rear differential 30 housed in a differential case 35 comprises a pinion shaft 37 rotatably supported in the case 35, a pair of differential pinions 38 rotatably mounted on the pinion shaft 37, and a pair of side gears 39R and 39L meshed with the pinions 38. The side gears 39R and 39L are connected to the axles 23R and 23L through splines, respectively.

The differential case 35 has a cylindrical portion 35b rotatably supported in a retainer bearing 35c secured to the carrier 31 through a taper roller bearing 34 and has a cylindrical portion 35a rotatably supported in a clutch housing (restricting clutch case) 51 through a taper roller bearing 34. The cylindrical portion 35a is rotatably mounted on the axle 23R through a bearing 53.

A fluid operated multiple-disk friction clutch 55 is housed in the clutch housing 51 and mounted on the axle 23R and the cylindrical portion 35a. The clutch 55 is supplied with oil by the oil pump 61.

The clutch 55 comprises an outer drum 55a secured to the axle 23R and an inner drum 55b splined on the cylindrical portion 35a. A plurality of outer disks 55c are splined on the drum 55a and a plurality of inner disks 55d are splined on the drum 55b, disposed alternately with the disks 55c. A ring piston 55f is slidably mounted on an inner wall of the clutch housing 51 and on an inner guide portion 51b thereof. The piston 55f engages with the outermost disk 55c and with a spring 55g. A piston oil chamber 55e is defined between the piston 55f and the housing 51.

An oil chamber 51a of the clutch housing 51 is communicated with the oil chamber 41 of the extension case 41 through a passage (not shown) so that the clutch 55 is lubricated with the same oil as the clutch 45.

A hydraulic control system for the clutches 45 and 55 is described hereinafter with reference to FIGS. 4a and 4b. The hydraulic control system comprises an oil pressure control unit 62 and a control unit 70. The oil pressure control unit 62 has a pressure regulator valve 63, a pilot valve 67, a clutch control valve 65a and a solenoid operated duty control valve 69a for controlling the transfer clutch 45, and a clutch control valve 65b, and a solenoid operated duty control valve 69b for controlling the differential restricting clutch 55.

Oil from the oil pump 61 driven by the motor 60 is supplied to the pressure regulator valve 63 by which the pressure of oil is regulated at a predetermined value. The oil is fed to the piston chamber 45e of the transfer clutch 45 through the clutch control valve 65a and an oil passage 66a. The pilot valve 67 operates to provide a constant pilot pressure The solenoid operated duty control valve 69a is operated by pulses from the control unit 70 at a duty ratio dependent on driving conditions of the vehicle, so that the draining of the oil from the control valve 69a provides a control pressure. The control pressure is applied to an end of the transfer control valve 65a through an oil passage 58a to control the oil supplied to the clutch 45 so as to control clutch pressure. The regulator valve 63 is further communicated with the piston chamber 55e of the clutch 55 through an oil passage 64, a clutch control valve 65b and an oil passage 66b. The pressure of the oil is controlled in accordance with the pulses applied from the control unit 70 to the solenoid operated valve 69b in the same manner as above.

The control unit 70 is fed with output signals from a front-wheel speed sensor 71, a rear-wheel speed sensor 72, a right-rear-wheel speed sensor 74, a left-rear-wheel speed sensor 73, a throttle position sensor 76, a shift range sensor 77, a steering angle sensor 78 and a G-sensor 79, which are provided for determining the driving conditions of the motor vehicle. A front-wheel speed $N_F$ from the front-wheel speed sensor 71 and a rear-wheel speed $N_R$ from the rear-wheel speed sensor 72 are applied to a speed difference calculator 80a where the speed difference $\Delta Na$ between the front-wheel speed $N_F$ and the rear-wheel speed $N_R$ is calculated in accordance with $\Delta Na = N_F - N_R$. When the difference $\Delta Na$ exceeds a predetermined value, a slip determining section 81a applies a slip signal to a clutch pressure providing section 82a. The clutch pressure providing section 82a has a clutch pressure look-up table storing a plurality of maximum clutch pressures each corresponding to a steering angle $\theta$. Namely, the pressure decreases as the steering angle $\theta$ increases, thereby preventing tight corner braking. The clutch pressure Pa is derived from the look-up table in accordance with the steering angle $\theta$ from the steering angle sensor 78. The derived clutch pressure Pa is fed to a duty ratio providing section 83a where a duty ratio corresponding to the clutch pressure Pa is obtained. A duty ratio pulse signal from the duty ratio providing section 83a is applied to the solenoid operated valve 69a.

When the speed difference $\Delta Na$ is smaller than the predetermined value, a normal driving determining section 84a applies a normal driving determining signal to a clutch pressure providing section 85a to derive a clutch pressure Pa from a look-up table. The clutch pressure Pa is derived from the table in accordance with a vehicle speed V corresponding to the rear-wheel speed from the rear-wheel speed sensor 72 and a throttle valve opening degree $\phi$ from the throttle position sensor 76. Thus, the clutch pressure Pa is controlled so as to transfer the engine torque to the rear wheels 24R and 34L in dependency on load distribution ratios of the front and the rear axles. The clutch pressure Pa is further corrected by a gear ratio e determined by the shift range sensor 77, steering angle $\theta$ and acceleration g detected by the G-sensor 79. That is, the clutch pressure is increased in a low engine speed range and decreased with an increase of the steering angle $\theta$ and increased with an increase of the acceleration g so that an optimum clutch pressure in accordance with the driving conditions can be provided. The duty ratio signal corresponding to the clutch pressure Pa is also fed to the solenoid operated valve 69a.

The control unit 70 is further provided with a system for controlling the clutch pressure Pb of the differential restricting clutch 55 in almost the same manner as the clutch 45. A speed difference calculator 80b is fed with a left-rear-wheel speed $N_L$ and a right-rear-wheel speed $N_{RI}$ to calculate the speed difference $\Delta Nb$ in accordance with $\Delta Nb = N_L - N_{RI}$. It is determined whether one of the left and right wheels slips, or the vehicle is normally driven at a slip determining section 81b and a normal driving determining section 84b. An optimum clutch pressure Pb is derived from tables in clutch pressure providing sections 82b and 85b and corrected dependent on the driving conditions. A duty ratio signal corresponding to the clutch pressure Pb is fed to the solenoid operated valve 69b from a duty ratio providing section 83b.

Describing the operation of the system, the power of the engine 1 is transmitted to the manual transmission 10 through the clutch 2 and the sub-transmission 3. The output of the transmission 10 is transmitted to the front differential 5 through the output shaft 12 and to the front wheels 6. The power is transmitted to the rear wheels 24L and 24R through the transfer device 7, the propeller shaft 21, the rear drive shaft 25, the transfer clutch 45 and the rear differential 30.

Figure 5A:
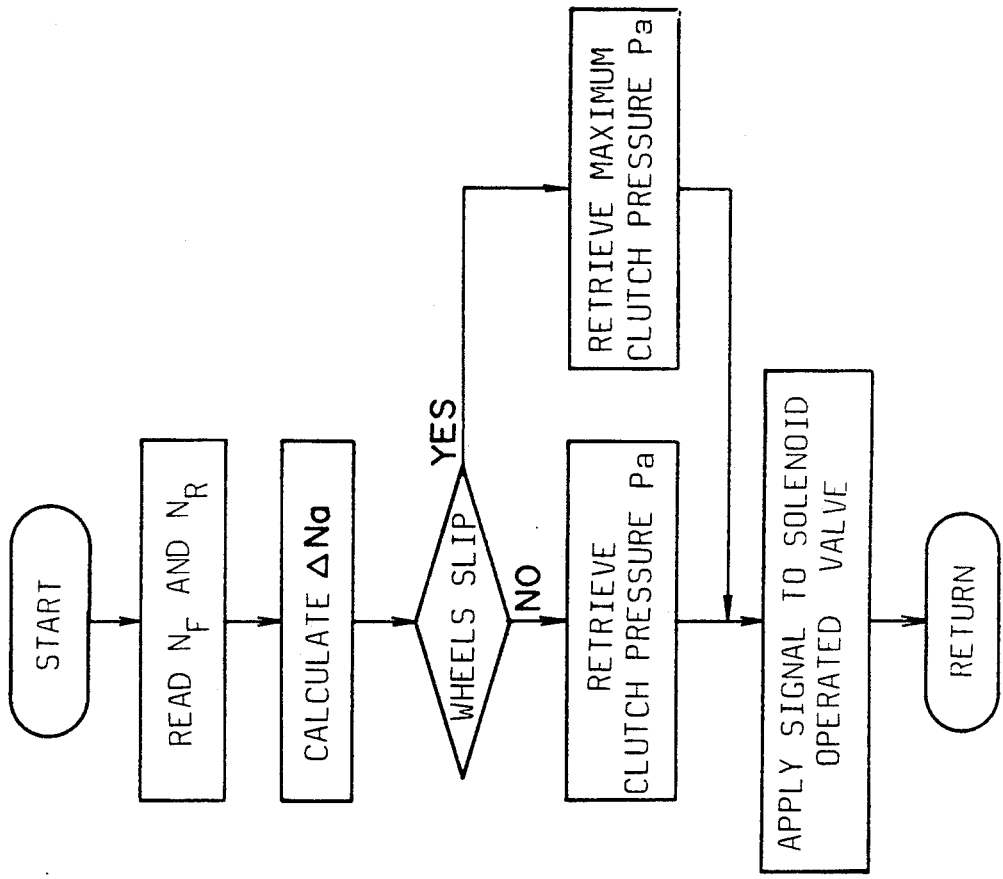

While the vehicle is driven, the output signals from the various sensors representing such factors as the front-wheel speed $N_F$ and the rear-wheel speed $N_R$ are fed to the control unit 70 to carry out a program shown in FIG. 5a. When the vehicle is driven on a dry road under a steady driving condition, the speeds of the front and rear wheels are substantially equal ($N_F \doteq N_R$) so that it is determined that the vehicle is normally driven. Consequently, the solenoid operated valve 69a is applied with the duty ratio signal to continuously change the clutch pressure Pa, thereby distributing the torque to the rear wheels at a ratio which coincides with the axle load distribution ratio.

In the hydraulic control circuit, the oil pump 61 is driven by the motor 60 to supply oil to the clutch control valve 65a through the regulator valve 63. The control pressure regulated by the pilot valve 67 is further controlled by the solenoid operated valve 69a which drains oil in dependency on the duty signal. The control pressure is applied to the chamber 45e so that the piston 45g pushes the disks 45c and 45d. Accordingly, the power is distributed to the front wheels and to the rear wheels in accordance with the transmission torque of the transfer clutch 45.

FIG. 5b is a flowchart showing the operation for controlling the clutch 55. The left-wheel speed $N_L$ and the right-wheel speed $N_{RI}$ are detected and the speed difference $\Delta Nb$ between the left wheel and the right wheel is calculated. When the vehicle is normally driven, the speeds $N_L$ and $N_{RI}$ are substantially equal ($N_L \doteq N_{RI}$). Therefore, the clutch pressure Pb is set substantially to zero so as to release the clutch 55. As a result, the vehicle can negotiate a corner with the differential operation.

At a start or at an acceleration of the vehicle, the clutch pressure Pa of the transfer clutch 45 is increased to provide the transfer torque, and hence, the distribution ratio of the torque transmitted to the rear wheels, thereby increasing four-wheel drive characteristics. At the same time, the clutch pressure Pb of the clutch 55 also increases. Thus, the piston 55f presses the disks 55c and 55d, thereby generating differential operation restricting torque between the differential case 35 and the side gears 39R. As a result, the differential 30 is locked to provide stable driving and to effectively transmit the torque to the rear wheels 24L and 24R, thereby increasing starting and accelerating characteristics. When the vehicle is turning a corner, the clutch pressures Pa and Pb decrease in accordance with the increase in the steering angle $\theta$. The torque distributed to the rear wheels and the restricting torque are both reduced to ensure smooth steering operation without causing tight corner braking.

If the front wheels slip on a muddy road, a large speed difference $\Delta Na$ is generated so that the slipping of the wheels is detected. Thus, a maximum clutch pressure Pa is determined so as to completely engage the transfer clutch 45 to connect the front and rear wheels. The torque is substantially equally distributed to the front and rear wheels so that the slipping is prevented, thereby ensuring good driveability.

When one of the rear wheels 24L and 24R slips, it is determined that the wheel is slipping in accordance with the large speed difference $\Delta Nb$. Thus, the clutch pressure Pb for the clutch 55 becomes maximum to completely engage the clutch 55. The differential 30 is consequently locked so that the vehicle no longer is stuck. Such an operation for preventing slipping is performed separately, or at the same time.

The distribution ratio of the torque to the front and rear wheels and the restricting operation of the differential are controlled in accordance with the driving conditions and the conditions of the road surface.

Figure 6A:
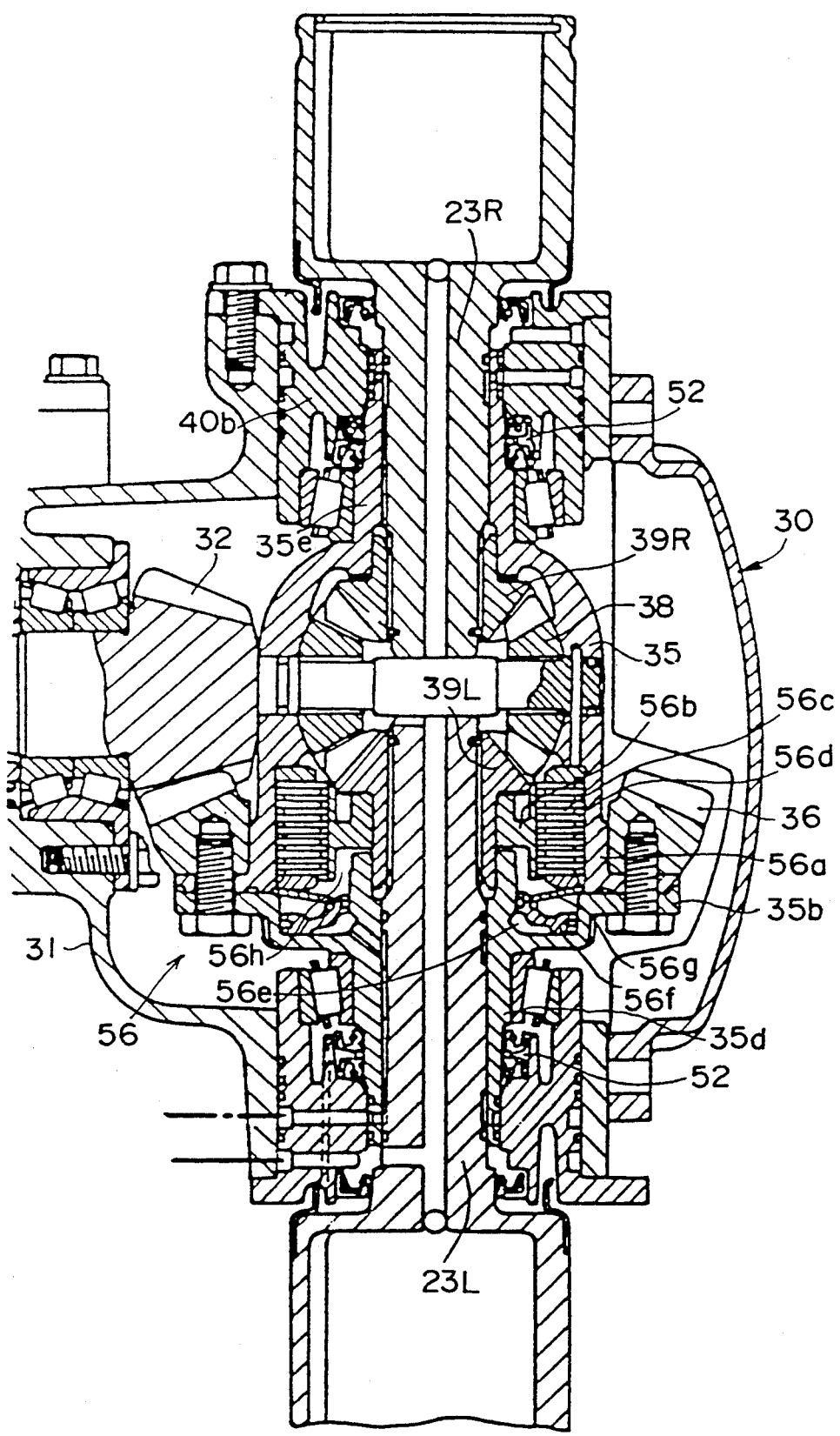
FIGS. 6a and 6b show a sectional view showing a main part of a second embodiment of the invention.
Figure 6B:
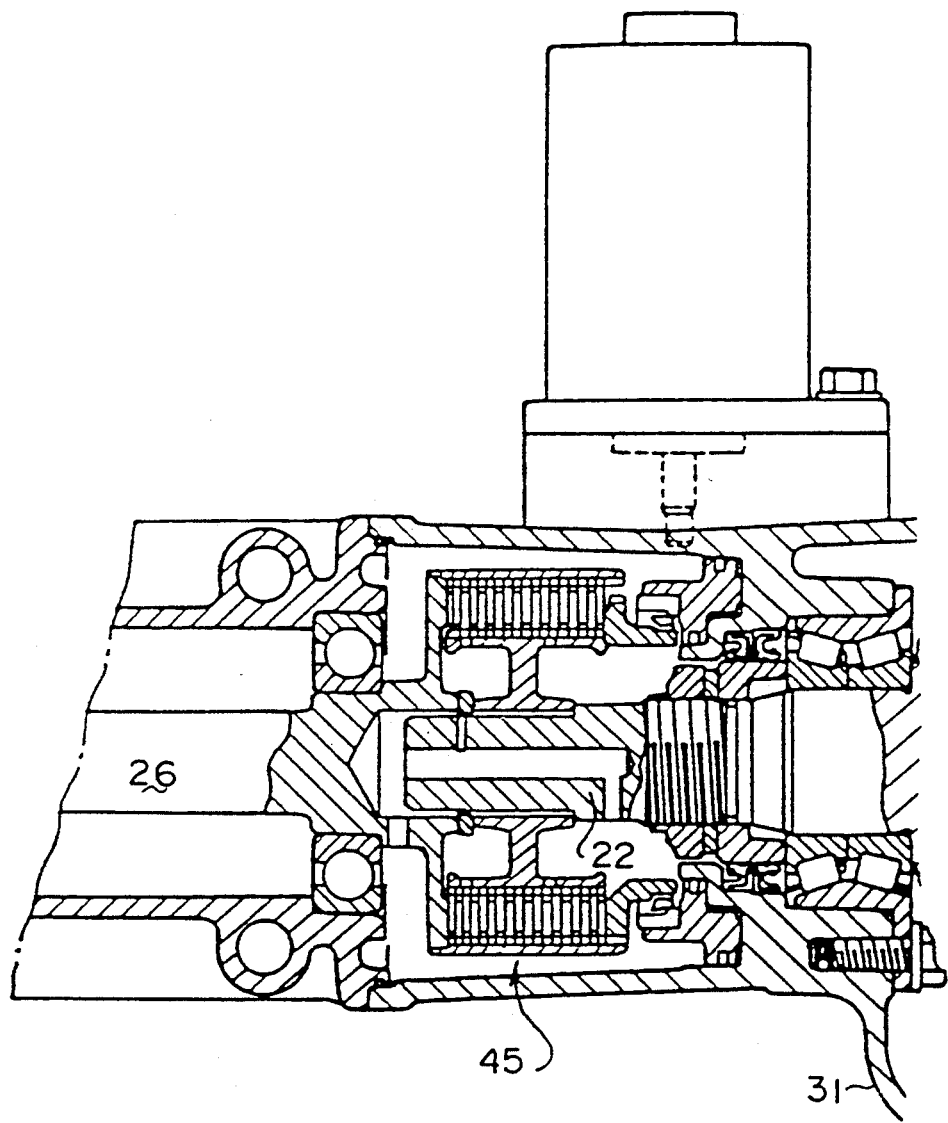

FIGS. 6a and 6b show the second embodiment of the present invention. In the embodiment, a fluid operated multiple-disk friction clutch 56 is disposed between the case 35 and the side gear 39L of the rear differential 30.

The axle 23L of the left rear wheel 24L is splined to the hub of the side gear 39L and rotatably supported in a cylindrical portion 35d of the differential case 35. The axle 23R of the right rear wheel 24R is splined to a hub of the side gear 39R and rotatably supported in a cylindrical portion 35e, integral with the case 35. The cylindrical portion 35d and 35e, are rotatably supported in retainer bearings 40a and 40b secured to the carrier 31. The clutch 56 is mounted on an inside wall of the differential case 35 of the rear differential 30. The differential case 35 is used as an outer drum 56a of the clutch 56. A hub of the inner drum 56b is splined to the hub of the side gear 39L and rotatably supported with the inner end of the cylindrical portion 35d. A plurality of outer disks 56c are splined on an inner periphery of the outer drum 56a and a plurality of inner disks 56d are splined on an outer periphery of the inner drum 56b, disposed alternately with the disks 56c. A ring piston 56f is slidably engaged with an inner periphery of the cylindrical portion 35d. A piston oil chamber 56e is formed between the piston 56f and the case 35. A centrifugal oil pressure chamber 56h is defined opposite to the oil chamber 56e. A spring 56g is disposed in the chamber 56h between the piston 56f and an end disk 56d.

Oil seals 52 are disposed between the outer peripheries of the cylindrical portions 35d and 35e, and the retainer bearings 40a and 40b so as to prevent the lubricating oil from entering the space 41a in the extension case 41.

When the centrifugal force of the fluid is exerted in the chamber 56e, the piston 56f presses the end disk. However, the centrifugal force of the fluid in the chamber 56h is exerted on the piston 56f. Thus, the oil pressure on the piston 56f by the centrifugal force in the oil chamber 56e is cancelled, thereby ensuring the control of the clutch torque in accordance with the clutch pressure.

Other structures are the same as the first embodiment and the same parts thereof are identified with the same reference numerals as FIGS. 1 to 6.

The hydraulic control system is controlled in the same manner as the first embodiment.

Consequently, the same effect as described hereinbefore in the first embodiment is achieved.

Figure 7:
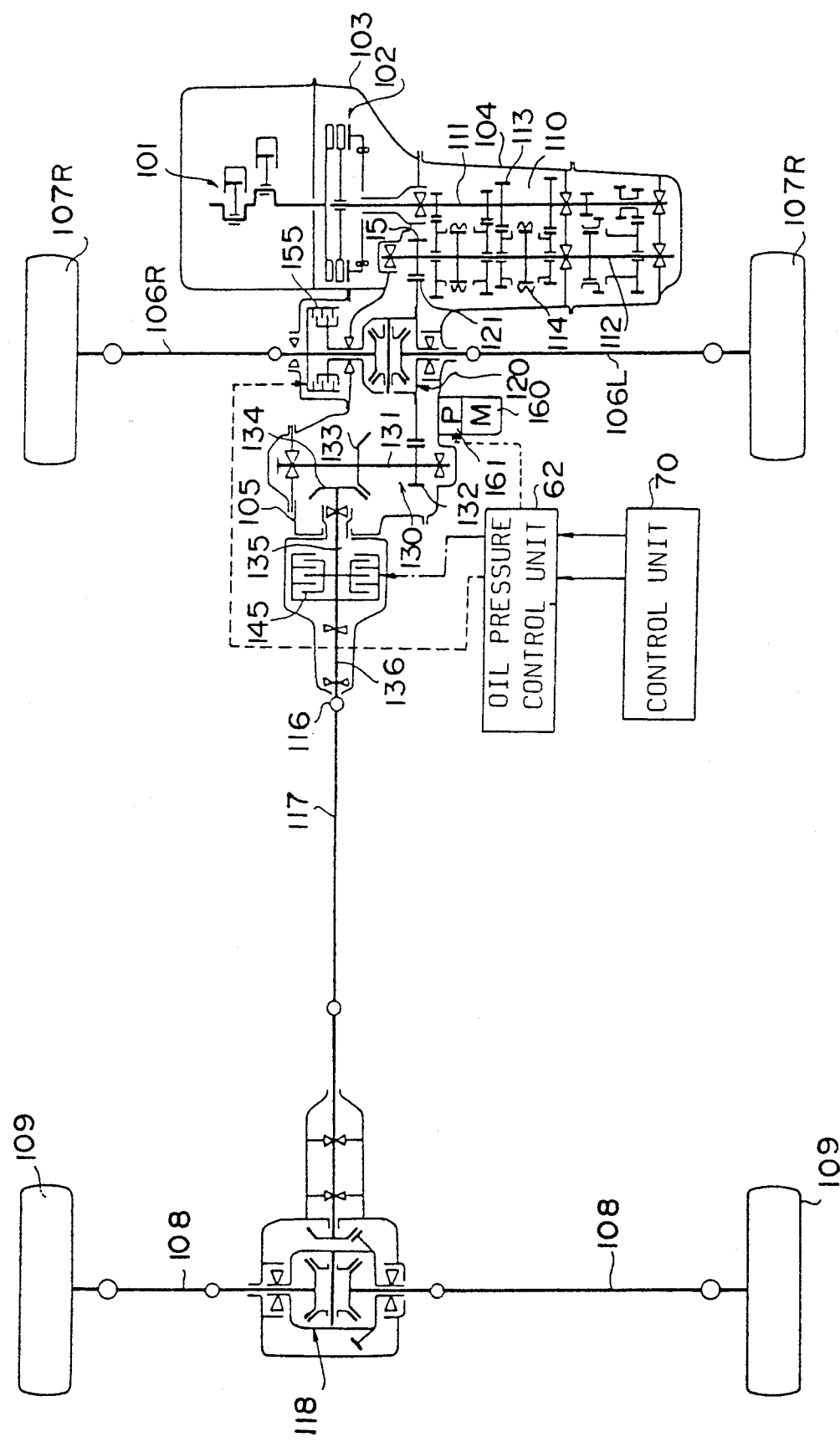
FIG. 7 shows a schematic diagram of a third embodiment of the present invention.

FIG. 7 shows a trans-axle power transmission type of the third embodiment to which the present invention is applied. In a rear portion of the motor vehicle, an engine 101, a clutch 102 housed in a clutch housing 103 and a manual transmission 110 in a transmission case 104 are laterally mounted. The transmission 110 has an input shaft 111, an output shaft 112 parallel to the input shaft 111, a plurality of change-speed gears 113 and synchronizers 114. The power transmission system has a front power train and a rear power train. The rear power train has a rear differential 120 housed in a transmission case 104. The rear power train comprises a transfer device 130 housed in the transmission case 104 and an extension case 105, a propeller shaft 117, a transfer clutch 145 in the form of a fluid operated multiple-disk friction clutch, a universal joint 116 and a rear differential 118.

The power of the engine 101 is transmitted to the transmission 110 through the clutch 102. The output torque of the transmission is transmitted to rear wheels 107R and 107L through an output gear 115, a final reduction gear 121, the rear differential 120, and axles, 106R and 106L. A restricting clutch 155 is further provided between the differential 120 and the axle 106R so as to restrain the differential operation of the differential 120. The final reduction gear 121 engages with an input gear 132 of the transfer device 130, which is securely mounted on a transfer shaft 131. The transfer shaft 131 is operatively connected to an input shaft 135 of a transfer clutch 145 through a pair of bevel gears 133 and 134, thereby transmitting the power to the transfer clutch 145. The power is transmitted to front wheels 109 through the rear differential 118 and axles 108 at a predetermined distribution ratio determined by the clutch 145.

Figure 8A:
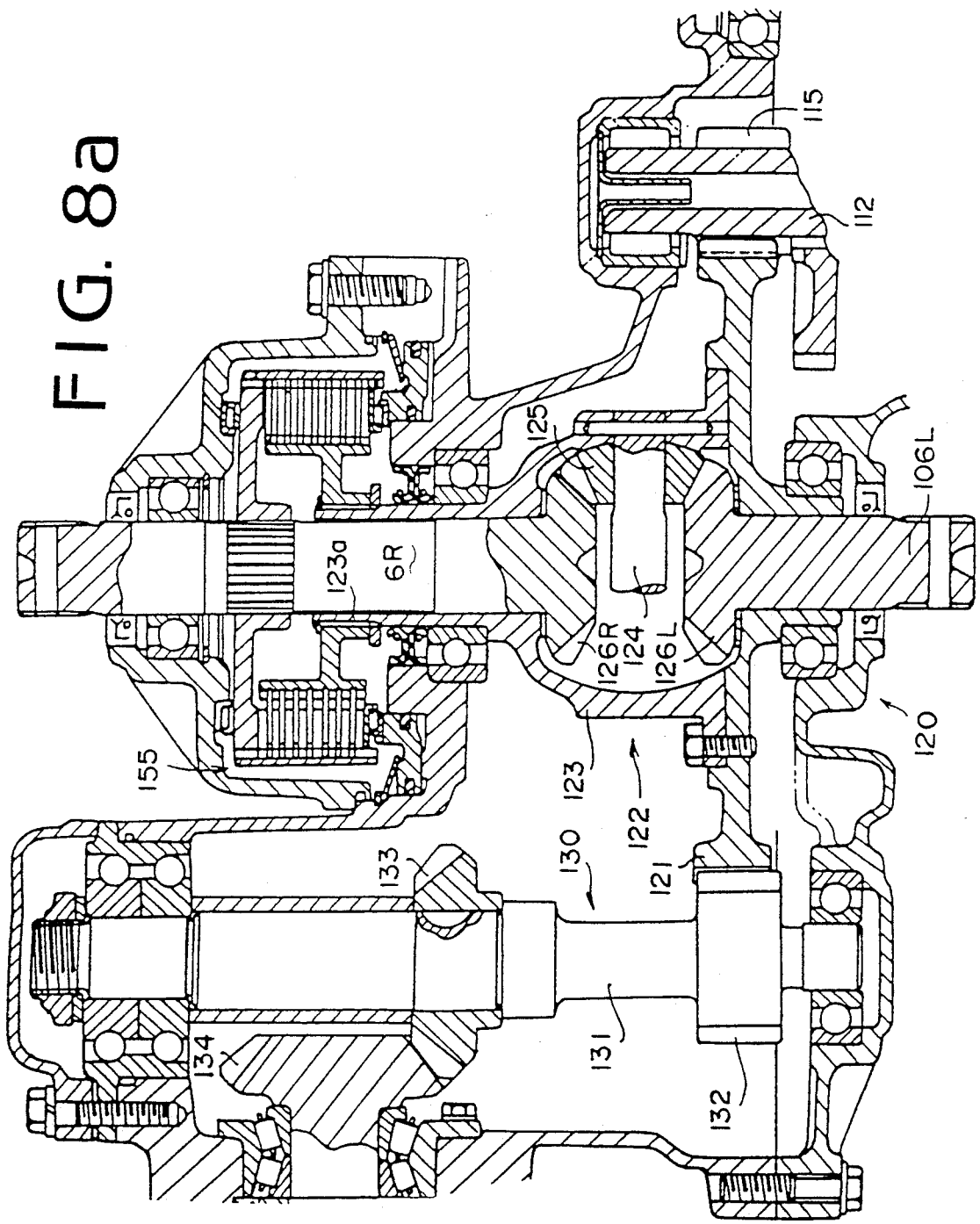
FIGS. 8a and 8b show a sectional view of a main part of the third embodiment.
Figure 8B:
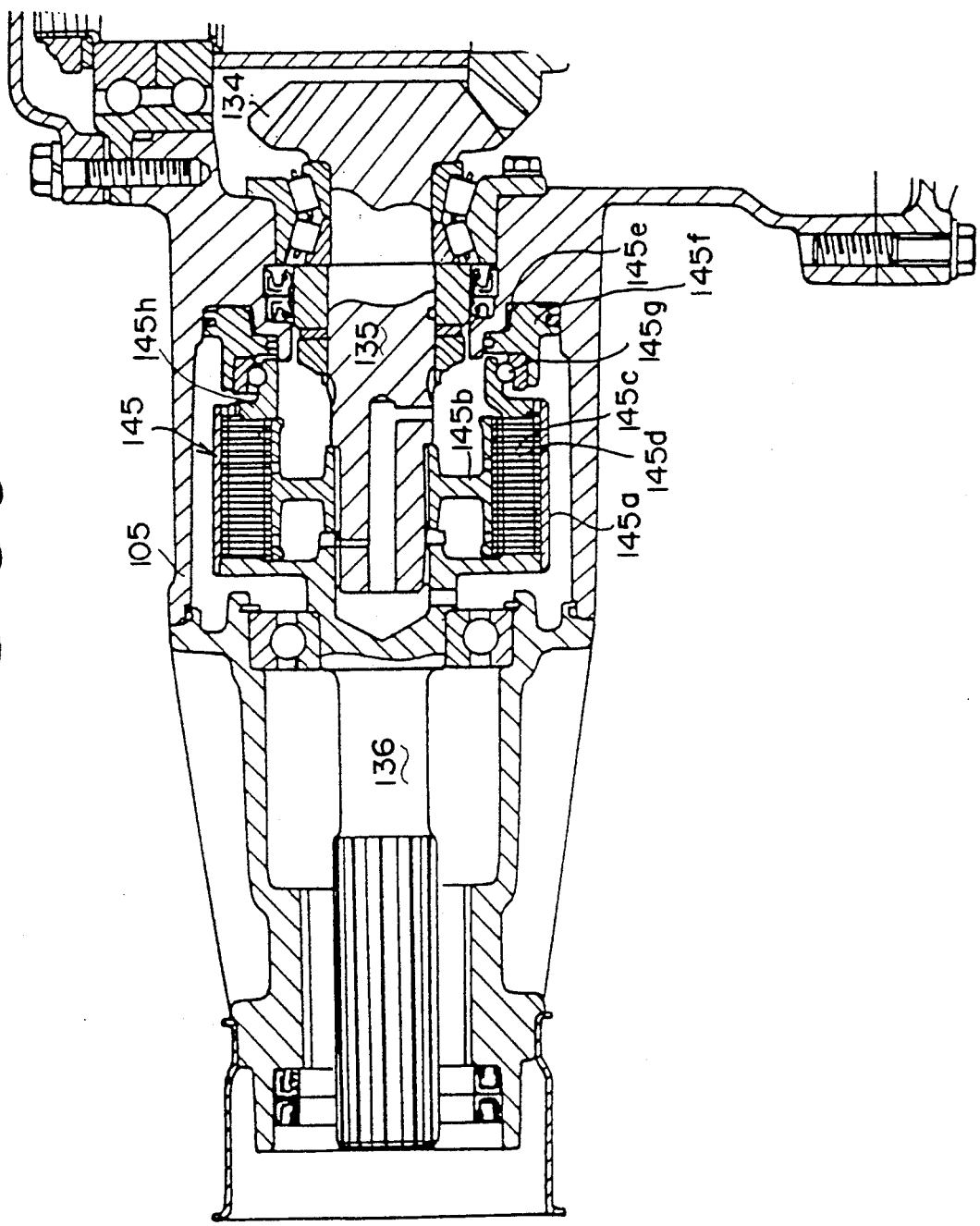

Referring to FIGS. 8a and 8b showing the rear differential 120 and the restricting clutch 155, the rear differential 120 comprises a differential case 123 integral with the final reduction gear 121, a pinion shaft 124 secured to the differential case 123, a pair of pinions 125 rotatably mounted on the pinion shaft 124 and a pair of bevel side gears 126L and 126R meshed with the pinions 125. Thus, the differential 120 is operated to transmit the engine torque to the left and the right rear wheels 107L, 107R and to absorb the difference of speeds there between.

The clutch 155 in a housing 151 is mounted on the right axle 106R in the same manner as the clutch 55 in the first embodiment.

The extension case 105 is further extended to house the transfer clutch 145. A drive shaft 136 is rotatably mounted in the extension case 105 and connected to the propeller shaft 117.

The transfer clutch 145 comprises a drive drum 145b splined on the input shaft 135 and a driven drum 145a secured to a flange of the drive shaft 136. A plurality of drive disks 145d are splined on the drum 145b together with a pair of retainers 145h provided adjacent both end disks 145d, and a plurality of driven disks 145c are splined on the drum 145a, disposed alternately with the disks 145c. A piston 145f is slidably mounted on an inner wall of the extension case 105 to engage with an outermost retainer 145h through release bearing 145g. A piston chamber 145e is defined by the piston 145f and a guide cylinder of the extension case 105.

Since the clutches 145 and 155 are provided with the oil having a desired characteristic, for example, ATF, sticking/slipping of the disks does not occur. Thus, uncomfortable oscillation and noise are prevented, and the reliability and durability of the power transmitting system are improved.

Figure 4A:
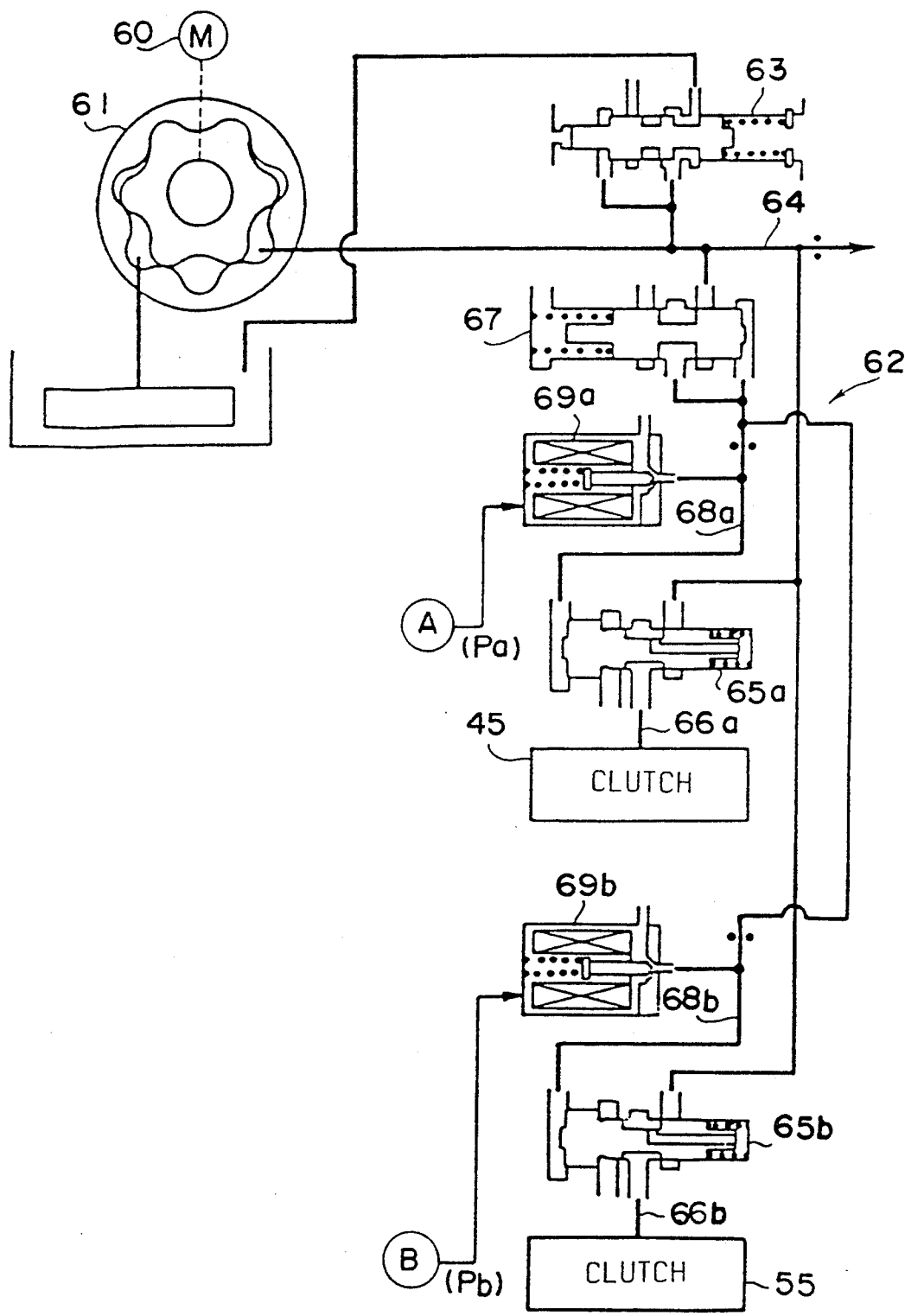

The clutches 145 and 155 are operated by the oil pressure control unit 62 and the control unit 70 shown in FIGS. 4a and 4b.

Describing the operation of the system, the power of the engine 101 is transmitted to the transmission 110 through the clutch 102. The torque is directly transmitted to the rear differential 120 and the torque is further transmitted to the front differential 118 through the transfer clutch 145 for providing the four-wheel drive.

When the left-rear-wheel 107L rotates faster than the right-rear-wheel 107R ($N_L > N_{RI}$) and the difference $\Delta Nb$ ($N_L - N_{RI}$) of the speeds are smaller than the predetermined value, a clutch pressure Pb derived from the table is applied to the restricting clutch 155, thereby generating restricting torque Tc. Since the differential case 122 rotates faster than the right wheel speed $N_{RI}$ by $\Delta Nb/2$, a torque is transmitted to the right wheel from the case 122 through the clutch 155. Therefore, when the torque transmitted to the final reduction gear 121 is Ti, the left rear wheel torque and the right rear wheel torque are expressed as $(Ti - Tc)/2$ and $(Ti + Tc)/2$, respectively. Thus, a smaller torque is transmitted to the left wheel than to the right wheel. On the other hand, when the right wheel speed is larger than the left wheel speed ($N_{RI} > N_L$), the left wheel torque is represented by $(Ti + Tc)/2$ and the right wheel torque is represented by $(Ti - Tc)/2$, thereby transmitting a larger torque to the left wheels. Thus, by changing the restricting torque Tc of the clutch 155, the differential 120 can be continuously changed from the differential operating state to the locked state.

Other operations are the same as in the first embodiment.

The present embodiment may be modified to provide the transfer clutch 145 on the transfer shaft 131.

In the vehicle having an antilock braking system on a brake system, when the antilock braking is effected, one of the clutches is controlled to obtain the optimum transmitting characteristics.

In accordance with the present invention, the transfer clutch and the differential restricting clutch disposed between the differential case and the side gear operate to distribute the optimum torque to the front and rear wheels and to produce the torque for restricting the differential operation of the differential. The distributing torque and the differential operation restricting torque are changed dependent on the driving conditions of the motor vehicle and surface conditions of the roads. Therefore, the vehicle can be easily and stably driven on slippery roads. Further, optimum driveability, driving stability, and starting characteristics of the vehicle are obtained and steerability of the vehicle is improved.

The transfer clutch and the differential operation restricting clutch are provided adjacent the differential so that the system becomes compact and the hydraulic control system is simplified. Both clutches are operated by the same electronic control unit thereby simplifying the unit.

Since the clutch and the rear differential are provided in the differential carrier separated from the hypoid gears, the oil having the appropriate characteristic can be used. Thus, sticking/slipping of the disks does not occur when the wheels turn around a corner.

Further, the clutch has the centrifugal oil pressure chamber so that the oil pressure exerted on the piston by the centrifugal force in the piston oil chamber is cancelled, thereby ensuring control of the clutch pressure.

While the presently preferred embodiments of the present invention have been shown as described, it is to be understood that these disclosures are for the purpose of illustration and that various changes and modifications may be made without departing from scope of the invention as set forth in the appended claims.

What is claimed is:

1. A power transmission system for a four-wheel drive motor vehicle having a transmission for transmitting output torque of an engine to front and rear wheels of the vehicle through a front differential and a rear differential respectively, comprising:
   a fluid-operated transfer clutch provided adjacent one of the front differential and the rear differential so as to transmit the output torque of the transmission to said one differential;
   the transfer clutch is provided in a case secured to a carrier of said one differential and separated from said one differential by an oil seal;
   a fluid-operated restricting clutch provided adjacent said one differential and disposed between said one differential and a corresponding axle of the vehicle so as to restrict differential of said one differential; and
   control means for controlling clutch pressure of each of the clutches in accordance with driving conditions of the vehicle.

2. A power transmission system for a four-wheel drive motor vehicle having a transmission for transmitting output torque of an engine to front and rear wheels of the vehicle through a front differential and a rear differential respectively, comprising:
   a fluid-operated transfer clutch provided adjacent one of the front differential and the rear differential so as to transmit the output torque of the transmission to said one differential;
   a fluid-operated restricting clutch provided adjacent said one differential and disposed between said one differential and a corresponding axle of the vehicle so as to restrict differential of said one differential;
   the restricting clutch is provided in a case secured to a carrier of said one differential and separated from said one differential by an oil seal; and
   control means for controlling clutch pressure of each of the clutches in accordance with driving conditions of the vehicle.

3. In a power transmission system for a four-wheel drive motor vehicle having a transmission operatively connected to an engine through a main clutch for transmitting output torque of the engine through a fluid operated transfer clutch to one of a front differential and a rear differential for transmitting output torque so as to drive front and rear wheels respectively of the vehicle, and each of the differentials having a carrier, the improvement in the system comprising:
   a transfer clutch case secured to one of said carrier corresponding to said one differential, said fluid-operated transfer clutch is provided in said transfer clutch case for transmitting the output torque of the transmission to said one differential;

a fluid-operated restricting clutch provided in a restricting clutch case secured to said carrier and disposed between an input element of said one differential provided in said carrier and a corresponding axle, for restricting differentiation of the differential; and control means for controlling clutch pressure of each of the clutches in accordance with driving conditions of the vehicle, thereby providing a compact and simplified power transmission system.

4. The system according to claim 3, wherein:

said restricting clutch is coaxially mounted on said corresponding axle and has an outer drum operatively connected to one of a differential case and said corresponding axle, an inner drum operatively connected to the other of said differential case and said corresponding axle, a plurality of outer disks secured to the outer drum, a plurality of inner disks secured to the inner drum, a piston slidably mounted on a piston chamber formed on a cylindrical inner wall of the differential case and operated by oil supplied to the piston chamber engaging the outer disks and inner disks with each other, and a centrifugal oil pressure chamber formed on the cylindrical inner wall of the differential case on an opposite side of the piston chamber so as to cancel centrifugal force of oil in the piston chamber, and said differential case is rotatably mounted on said one carrier.

5. The system according to claim 3, wherein:

said restricting clutch is coaxially mounted on said corresponding axle and has an outer drum operatively connected to one of a differential case and said corresponding axle, an inner drum operatively connected to the other of said differential case and said corresponding axle, a plurality of outer disks secured to the outer drum, a plurality of inner disks secured to the inner drum, a piston slidably mounted on a piston chamber provided on an inner wall of said restricting clutch case and operated by oil supplied to the piston chamber engaging the outer disks and inner disks with each other so as to extinguish centrifugal force of oil in the piston chamber, and said differential case is rotatably mounted on said one carrier.

6. The system according to claim 3, wherein:

said transfer clutch is coaxially mounted on a drive shaft and has an outer drum operatively connected to one of said drive shaft and a driven shaft, an inner drum operatively connected to the other of said shafts, a plurality of outer disks secured to the outer drum, a plurality of inner disks secured to the inner drum, and a piston slidably mounted on a piston chamber provided on a hollow potion of said transfer clutch case and operated by oil supplied to the piston chamber engaging the outer disks and inner disks with each other so as to extinguish centrifugal force of oil in the piston chamber.

7. The system according to claim 3, wherein:

said restricting clutch is located at one side of said one differential and said transfer clutch is disposed adjacent said one differential.

* * * * *